US012649112B2

(12) United States Patent
Alahgholipouromrani

(10) Patent No.: US 12,649,112 B2
(45) Date of Patent: Jun. 9, 2026

(54) GAME CONTROLLER COOLING COVER SYSTEM

(71) Applicant: Arash Alahgholipouromrani, San Jose, CA (US)

(72) Inventor: Arash Alahgholipouromrani, San Jose, CA (US)

( * ) Notice: Subject to any disclaimer, the term of this patent is extended or adjusted under 35 U.S.C. 154(b) by 254 days.

(21) Appl. No.: 18/377,770

(22) Filed: Oct. 7, 2023

(65) Prior Publication Data

US 2024/0115962 A1 Apr. 11, 2024

Related U.S. Application Data

(60) Provisional application No. 63/378,921, filed on Oct. 10, 2022.

(51) Int. Cl.
*A63F 13/98* (2014.01)

(52) U.S. Cl.
CPC .................................... *A63F 13/98* (2014.09)

(58) Field of Classification Search
None
See application file for complete search history.

(56) References Cited

U.S. PATENT DOCUMENTS

| | | | | | |
|---|---|---|---|---|---|
| 5,046,739 A | * | 9/1991 | Reichow | ................. | A63F 13/02 |
| | | | | | 273/148 B |
| 5,501,458 A | * | 3/1996 | Mallory | .................. | A63F 13/98 |
| | | | | | 273/DIG. 30 |
| D396,495 S | * | 7/1998 | Hirokane | ..................... | D21/385 |

| | | | | | |
|---|---|---|---|---|---|
| 6,120,025 A | * | 9/2000 | Hughes, IV | ............ | A63F 13/98 |
| | | | | | 273/148 B |
| 6,375,571 B1 | * | 4/2002 | Ohnuma | ................. | A63F 13/52 |
| | | | | | 463/43 |
| D461,850 S | * | 8/2002 | Hussaini | ...................... | D21/333 |
| 6,530,570 B2 | * | 3/2003 | Ku | .......................... | A63F 13/24 |
| | | | | | 273/148 B |
| 6,899,222 B2 | * | 5/2005 | Jones | ..................... | B65D 75/32 |
| | | | | | 206/320 |
| 6,923,443 B1 | * | 8/2005 | Hughes, IV | ............ | A63F 13/98 |
| | | | | | 273/148 B |

(Continued)

FOREIGN PATENT DOCUMENTS

| | | | | | |
|---|---|---|---|---|---|
| CN | 101854985 A | * | 10/2010 | ............. | A63F 13/50 |
| DE | 102015115235 B3 | * | 7/2016 | ............. | A63F 13/24 |

(Continued)

*Primary Examiner* — Tramar Harper

(74) *Attorney, Agent, or Firm* — James R. McDaniel; Lawrence P. Zale; Zale Patent Law, Inc.

(57) ABSTRACT

A game controller cooling cover assembly is described having a flexible cover that has a non-slip gripping surface that provides protection to the controller and cooling to the user. The flexible cover comprises a flexible outer layer having numerous ventilation apertures. The flexible cover is spaced away from the controller with many offset ribs that create air channels between the controller and the flexible cover. A fan blows air through the air passages that are expelled through the ventilation apertures thereby cooling the user's bands. The cover has a split opening on the top side allowing the cover to be attached or taken off the controller. The split opening is held together with magnets for quick attachment and release. In an alternative embodiment, the battery pack is removable. This structure allows one battery pack to be charging while another is in use and allows for quick replacement of the battery.

17 Claims, 8 Drawing Sheets

(56) References Cited

U.S. PATENT DOCUMENTS

| | | | | |
|---|---|---|---|---|
| D521,567 S | * | 5/2006 | Svendsen | D14/401 |
| D534,962 S | * | 1/2007 | Svendsen | D14/401 |
| D578,167 S | * | 10/2008 | Harris | D14/401 |
| 7,731,191 B2 | * | 6/2010 | Sternberg | G06F 3/0202 |
| | | | | 273/148 B |
| D765,789 S | * | 9/2016 | Buller | A63F 13/24 |
| | | | | D21/333 |
| D864,302 S | * | 10/2019 | Strahle | D21/333 |
| D870,207 S | * | 12/2019 | Ali | D21/333 |
| 2005/0075172 A1 | * | 4/2005 | Coleman | A63F 13/98 |
| | | | | 463/47 |
| 2006/0178211 A1 | * | 8/2006 | Chien | A63F 13/24 |
| | | | | 341/20 |
| 2006/0211498 A1 | * | 9/2006 | Higgins | A63F 13/98 |
| | | | | 463/46 |
| 2008/0122173 A1 | * | 5/2008 | Harris | A63F 13/20 |
| | | | | 273/148 B |
| 2009/0038721 A1 | * | 2/2009 | Wakitani | A63F 13/24 |
| | | | | 150/154 |
| 2010/0178981 A1 | * | 7/2010 | Holcomb | A63F 13/98 |
| | | | | 463/37 |
| 2010/0279771 A1 | * | 11/2010 | Block | A63F 13/98 |
| | | | | 463/37 |
| 2012/0244944 A1 | * | 9/2012 | Kotkin | A63F 13/24 |
| | | | | 463/37 |
| 2014/0018173 A1 | * | 1/2014 | Urhman | A63F 13/214 |
| | | | | 463/37 |
| 2014/0141891 A1 | * | 5/2014 | Georgy | A63F 13/24 |
| | | | | 463/47 |
| 2017/0189800 A1 | * | 7/2017 | Crain | A63F 13/24 |
| 2019/0054382 A1 | * | 2/2019 | Morris | B32B 25/16 |
| 2019/0351336 A1 | * | 11/2019 | Fletcher | A63F 13/98 |
| 2021/0038977 A1 | * | 2/2021 | Dixon | A63F 13/92 |
| 2023/0071216 A1 | * | 3/2023 | Samperi | A63F 13/98 |

FOREIGN PATENT DOCUMENTS

| | | | | | |
|---|---|---|---|---|---|
| GB | 2390130 A | * | 12/2003 | | G06F 1/203 |
| WO | WO-9962312 A1 | * | 12/1999 | | A63F 13/98 |
| WO | WO-2006099205 A2 | * | 9/2006 | | A63F 13/54 |

* cited by examiner

GAME CONTROLLER COOLING COVER SYSTEM

CROSS-REFERENCE TO RELATED APPLICATION

This application claims benefit of U.S. Patent Application 63/378,921, filed on Oct. 10, 2022, the disclosure of which is hereby incorporated by reference in its entirety to provide continuity of disclosure to the extent such a disclosure is not inconsistent with the disclosure herein.

BACKGROUND OF THE INVENTION

1. Technical Field

The present invention relates to a flexible cooling cover that retrofits existing handheld game controllers, and more specifically, it is a flexible cooling cover that retrofits existing handheld game controllers and includes a fan, air passages, and air holes to direct cooling air to the user's hands and outer protrusions to create an air space between the user's hands and the cover.

2. Description of Related Prior Art

The world is becoming more advanced than ever before. With the introduction of new technologies, gaming is becoming hi-power technology. In the past, most game users were children. However, over time, many more adults became involved in gaming since the introduction of Play-Station®, Nintendo®, and Sega Saturn® gaming devices.

Users may play video games for several hours straight. Since the user controls the game with a handheld controller, he/she may be holding the controller for long periods of time when playing the game. The controller's grippers surface and control buttons and other actuators of the major video games are typically made of hard polymeric material that is slippery and does not feel good when wet. Sometimes, the user must act quickly through the game controller to win the video games.

Since the users hold the controllers, usually with the same grip for several hours while playing the video game, the user's hands tend to sweat, thereby causing the user's fingers to slip off buttons, or other actuators which may cause the user to lose points and possibly lose control of the game.

Another problem is the usage of thumb buttons or palm area if the user's palm slips on the controller, thereby preventing the user from accurately operating the controller.

The handheld controllers are provided with the video game. However, one can buy additional or different controllers that are compatible with the video game. Since the video game manufacturers own intellectual property covering the controllers, they can limit those manufacturing and selling the controllers and keep the price of the controllers artificially high.

Currently, there is a need for a reasonably priced, and handheld controller that can be used without hand/finger slippage to the user's palm areas.

BRIEF SUMMARY

The present invention relates to a flexible covering for handheld controllers that has internal passageways, two fans, and outer protrusions that provide cooling air to a user's hand while playing a video game.

The fans direct cooling air through internal passageways to ventilation apertures through the cover.

The present invention preferably has a silicone rubber outer layer which allows for a better grip of the handheld controller. The fans are positioned at the ends of the right and left lobes of the controller that bring in air and force the air through elongated channels between the cover, internal ribs, and the controller surface.

There is a power source, preferably a battery pack assembly, that powers an electric motor for each fan. This may be a conventional battery pack using a conventional battery plug to couple electronically to the fans. Alternatively, the power source can include rechargeable batteries.

In an alternative embodiment, a battery pack assembly is a rechargeable unit that is held to the cover with magnets. There are also power contacts on the cover to receive the power from the battery pack assembly when the battery pack assembly is in the proper position with respect to the cover.

Another embodiment of the present invention is that the cooling fan is attached to the cover in the space between the left and right lobes of the controller. The fan provides approximately equal air flows through the conduits to both lobes. The air is released through ventilation apertures in the cover which passes from the conduits through the cover thereby cooling the user's hands.

BRIEF DESCRIPTION OF SEVERAL VIEWS OF THE DRAWINGS

The above and further advantages may be better understood by referring to the following description in conjunction with the accompanying drawings, in which the same numerals indicate the same structural elements and features in various figures. The drawings are not necessarily to scale, emphasis instead is placed upon illustrating the principles of the concepts. For example, the dimensions of some of the elements in the figures may be exaggerated relative to other elements to help to improve understanding of various example embodiments. Also, common but well-understood elements that are useful or necessary in a commercially feasible embodiment are often not depicted in order to facilitate a less obstructed view of these various example embodiments.

DETAILED DESCRIPTION OF THE DRAWINGS

Figure 1:
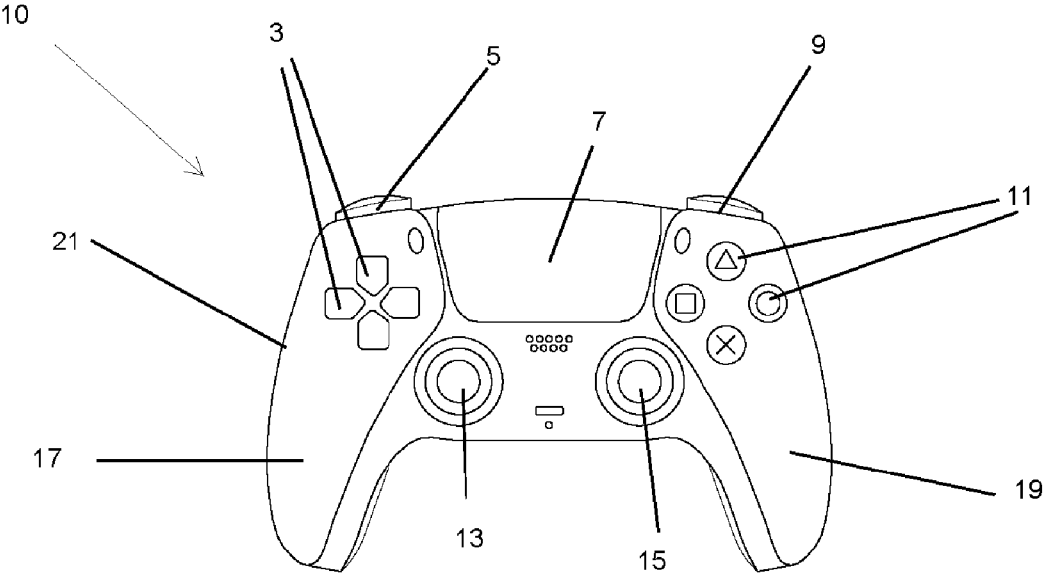
FIG. 1 is an image showing a conventional handheld controller for the Sony PS5 PlayStation® video game system.

FIG. 1 shows a handheld controller 10 for a conventional Sony PS5 PlayStation® video game system. Controller 10 has a left lobe 17, typically held by the left hand of the user playing a video game, and a right lobe 19 typically held by the right hand of the user.

There are directional buttons 3 at the front side of the left lobe 17. Pressing these directional buttons 3 typically moves an object in a video game left, right forward and backward.

There is a front, left, upper button 5 at the front end of the left controller lobe 17, and a front, right, upper button 9 at the front side of the right controller lobe 19. These have various functions depending upon the game being played.

Selection buttons 11 near the front of the right controller lobe 19 have pre-programmed functions.

There is a left knob 13 and a right knob 15 on a center portion of the controller 10 between the controller lobes 17,19.

At the front of the center portion of the controller 10 is a top pad 7. It is to be understood that even though controller 10 is described in detail in relation to a PS5 controller for a Sony PlayStation, there are similar controls on various other handheld controllers 10.

Figure 2:
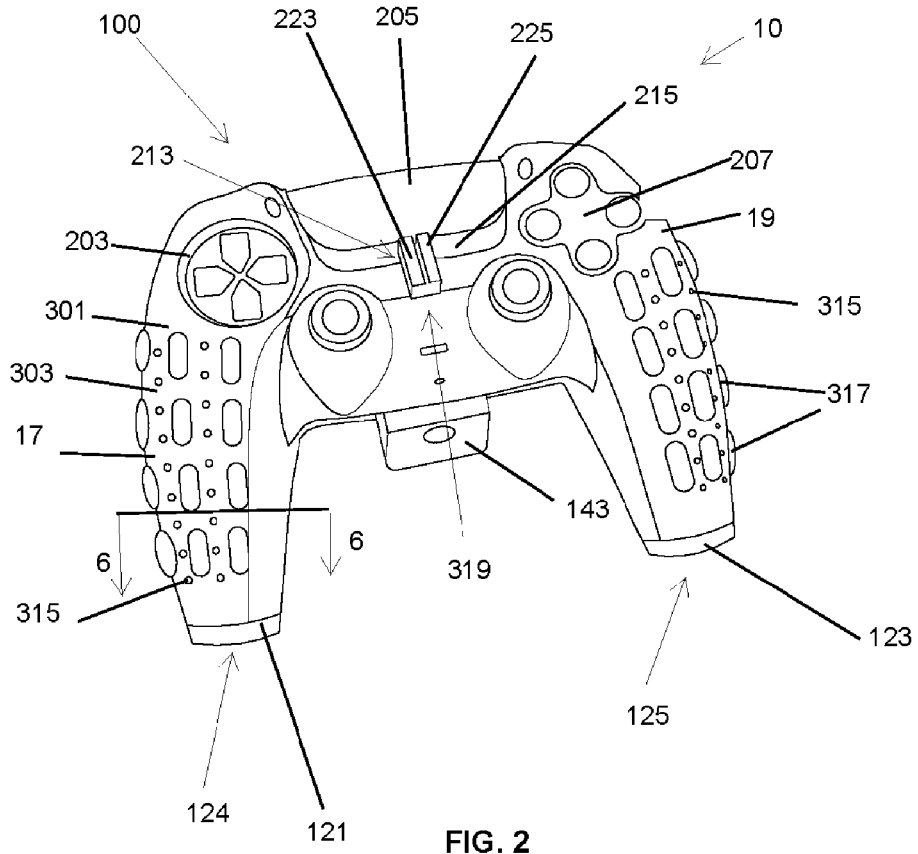
FIG. 2 is a top, perspective view of one embodiment of a cooling controller cover for retrofitting a conventional handheld controller for video games, according to the present invention.

FIG. 2 is a top, perspective view of an embodiment of a cooling cover assembly 100 that retrofits an existing hand-held controller 10.

The cooling cover assembly 100 has a flexible cover 301 having an outer cover surface 303 that opens at a connection point 319 to fit over controller 10. Flexible cover 301 also includes a top pad opening 205.

When fully in place, the left cover extension 213 meets and attaches to the right cover extension 215. In this embodiment, a left magnetic attachment 223 meets and secures a right magnetic attachment 225. This results in an easy magnetic attachment of the left cover extension 213 to the right cover extension 215 which can also be easily unattached thereby allowing the flexible cover 301 to be removed from controller 10.

As shown in FIG. 2, flexible cover 301 covers most of the left controller lobe 17. The flexible cover 301 has a directional pad opening 203 that allows access to the directional buttons 3 (FIG. 1).

Similarly, flexible cover 301 covers most of the right controller lobe 19. Furthermore, the flexible cover 301 has a selection pad opening 207 that allows access to the selection buttons 11 (FIG. 1).

Figure 6:
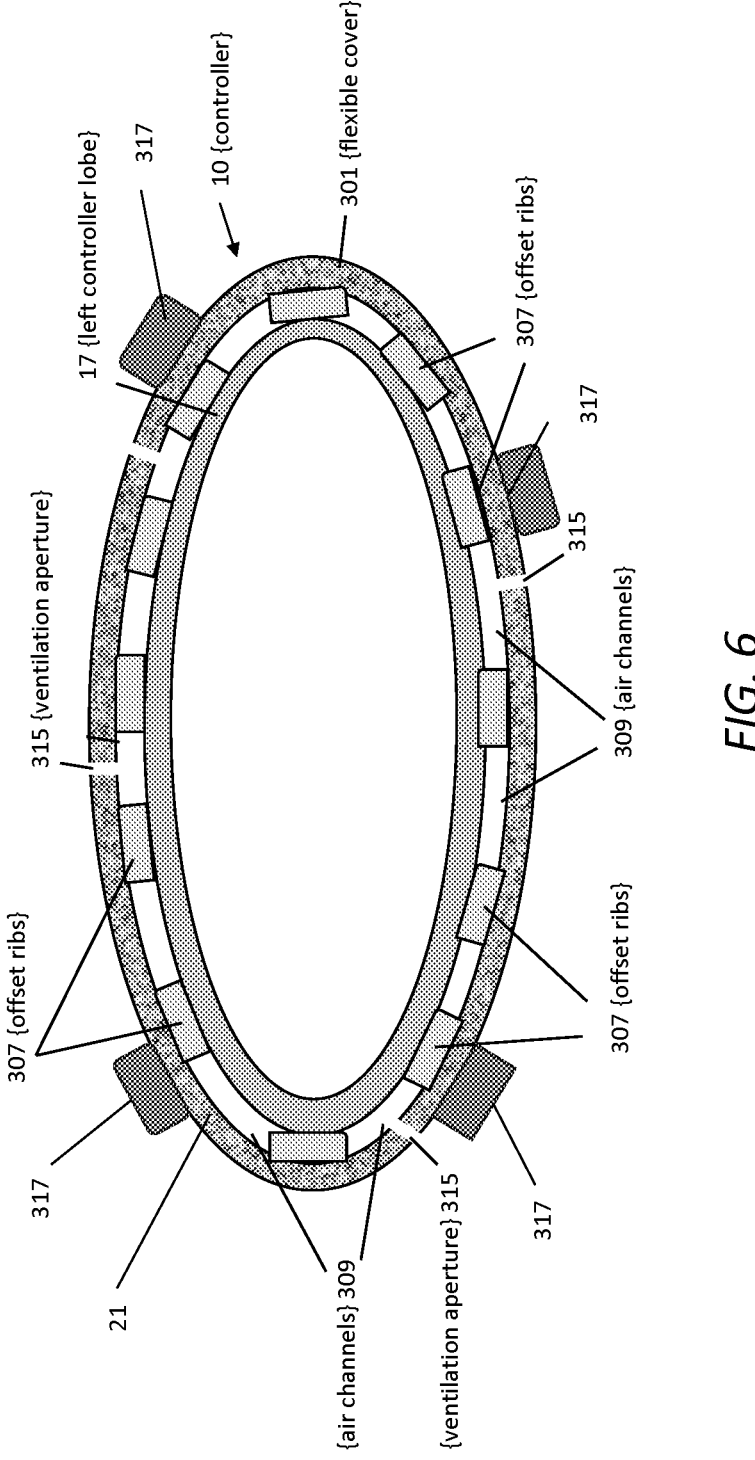
FIG. 6 is a cross-sectional view of the left controller lobe along the dashed line marked "FIG. 6-FIG. 6" of FIG. 2.

The rear of the left controller has an opening 124 and a left fan 121 and an opening 125 and a right fan 123 that suck in air and force the air through passageways (FIG. 4) between the inner surface of the cover 301 and a controller outer surface 21 (FIG. 6). The air is released through ventilation holes or apertures 315 that pass through the flexible cover 301.

A unique aspect of the present invention is that there are many ventilation apertures 315 in an area in the flexible cover 301 located adjacent to the palm area of the user which helps in releasing air in the palm area and helps in cooling the user's hands. The flexible cover 301 provides cooling air through internal air channels and ventilation apertures 315 to keep the user's hands cool and sweat-free. This increases comfort and reduces slippage on the controller and buttons.

Figure 3:
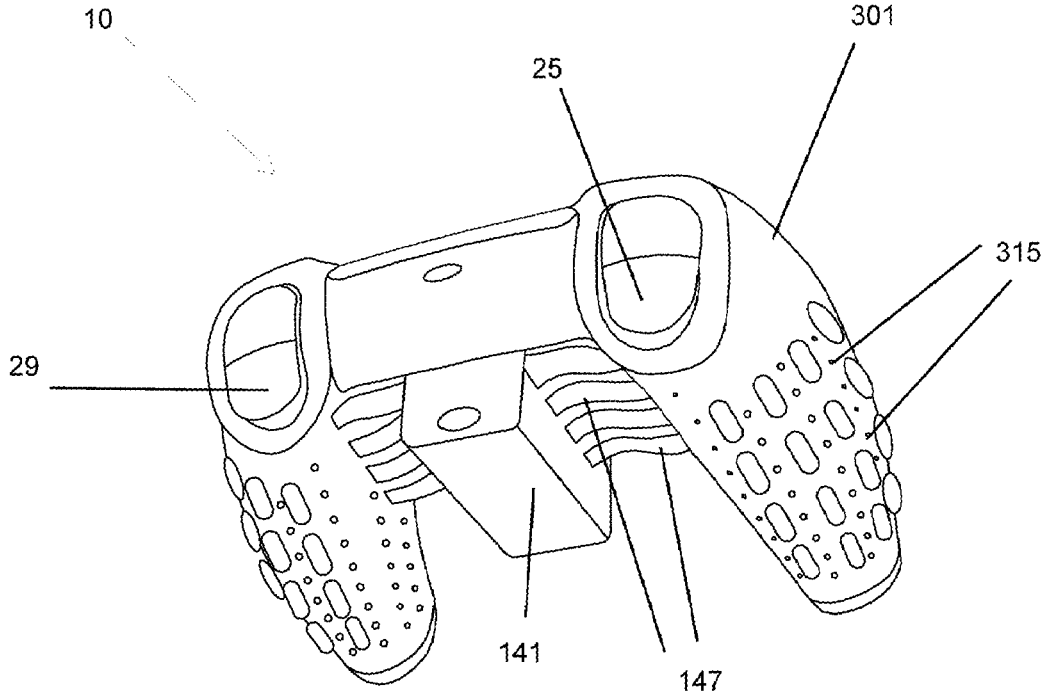
FIG. 3 is a bottom, perspective view of the cooling controller cover of FIG. 2 showing one embodiment of the battery pack assembly.

FIG. 3 is a bottom, perspective view of the cooling controller cover 301 of FIG. 2 showing one embodiment of battery assembly 141. In this embodiment, battery assembly 141 is an integral part of the flexible cover 301 located on the bottom surface of the controller 10, between the left controller lobe 17 and the right controller lobe 19 (FIG. 2).

Since the battery assembly 141 receives and holds the battery 143 (FIG. 2), there is considerable weight that is supported on the controller 10. Another unique aspect of the present invention is that to support this weight and prevent the flexible cover 301 from pulling away from the surface of controller 10 and creating an air leak, there are reinforced ribs 147 located on cover 301 between the battery assembly 141 and both controller lobes 17, 19. The reinforcement ribs 147 are considerably thicker and structurally stronger.

The view angle of FIG. 3 clearly shows the front left lower button 25 and the front right lower button 29 on the controller 10 and the ventilation apertures 315 on the flexible cover 301.

Figure 4:
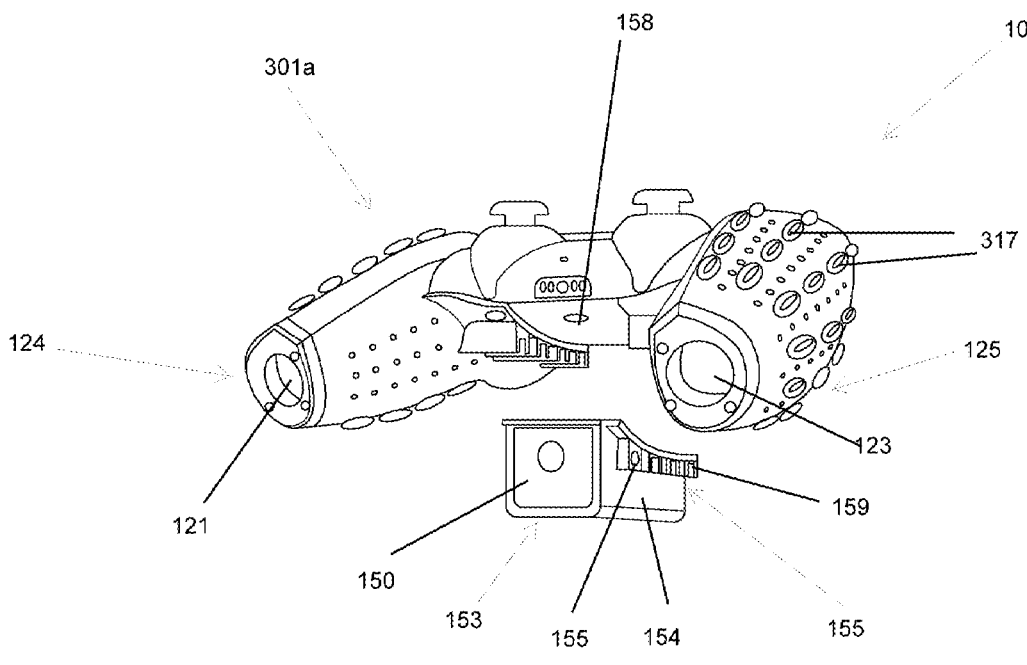
FIG. 4 is a rear, perspective view of a cooling controller cover for retrofitting a conventional handheld controller for video games, according to the present invention employing another embodiment of the battery pack assembly.

FIG. 4 is a rear, perspective view of embodiment of a cooling controller cover 301a for retrofitting a conventional handheld controller 10 for video games, according to the present invention employing another embodiment of a battery assembly 150. In this embodiment, a removable battery case 154 removably fits into a receiving structure 151 on controller 10. Electrical connectors 159 of the removable battery assembly 150 contact electrical connectors 158 to allow power to flow from the removable battery assembly 150 to a motor (not shown here) driving the left fan 121 and a motor (not shown here) driving the right fan 123 also driven by a motor (not shown here). There may also be one or more intermediate switches to activate the fans or change fan speed. In another embodiment, there is a shut-off switch (not shown) that allows or cuts off power from the removable battery assembly 150.

FIG. 4 also shows outer protrusions 317 that look like lumps on the outer surface of flexible cover 301. These are employed to prevent the user's hands from tightly gripping the controller 10 and therefore, blocking the ventilation apertures 315. In another unique aspect of the present invention, these outer protrusions 317 allow the free flow of cooling air out of the ventilation apertures 315. Also, the outer protrusions 317 will allow a free flow of air underneath the hands of the user even if the fans 121 and 123 are not operating since the outer protrusions 317 do not allow the user's hands to directly contact the entire surface of the flexible covers 301 and 301a (FIG. 6).

Figure 5:
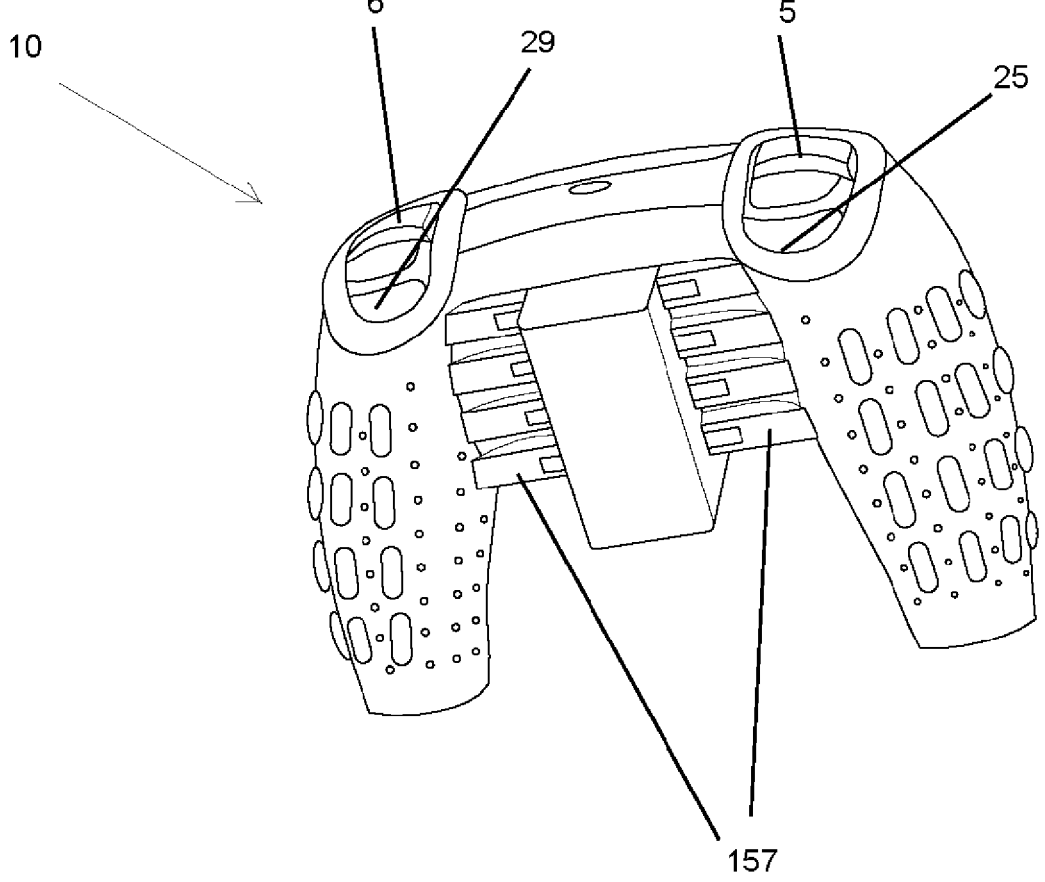
FIG. 5 is a bottom, perspective view of the cooling controller cover of FIG. 4 showing the reinforcement ribs.

FIG. 5 is a bottom, perspective view of the cooling controller cover of FIG. 4 showing the reinforcement ribs 157. These ribs 157 are similar to those of the embodiment of FIG. 3 and perform a similar function.

The front right upper button 6, front right lower button 29, front left upper button 5 and front left lower button 25 on controller 10 are visible as shown in FIG. 5.

FIG. 6 is a cross-sectional view of the left controller lobe 17 along the dashed line "FIG. 6-FIG. 6" of FIG. 2. The flexible cover 301 encloses most of controller 10. However, there are offset ribs 307 extending from the inside surface of flexible cover 301. These cause a spacing to be created between the inner surface of the flexible cover 301 and the surface of controller 10. The offset ribs 307 are designed to create elongated air channels 309 along the flexible cover 301. These elongated air channels 309 have ventilation apertures 315 that pass through the flexible cover 301 to the outside, to the user's hands. As discussed above, the outer protrusions 317 are also shown.

5
6

Figure 7:
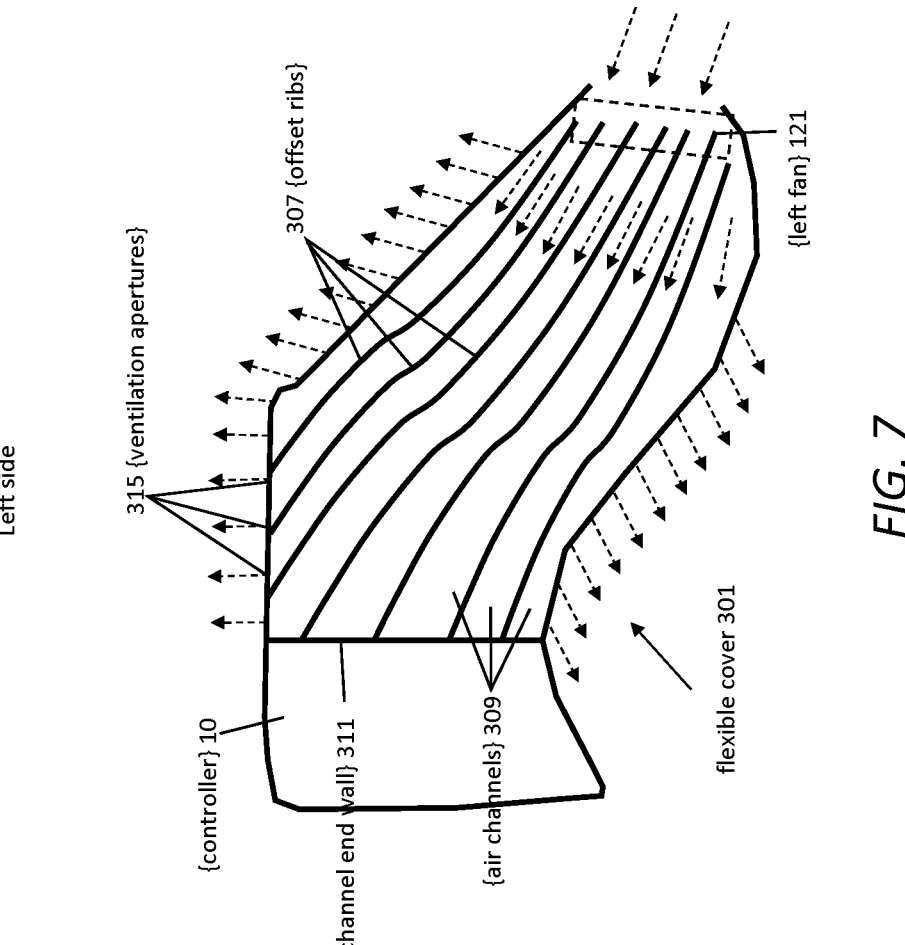
FIG. 7 is a partially cut-away, side elevational view of the cooling cover showing the air channels as an embodiment of the current invention.

FIG. 7 is a partially cut-away, side elevational view of a flexible cooling cover 301 with the outer surface of flexible cover 301 removed to show the air channels 309 as an embodiment of the current invention.

Flexible cover 301 is stretched over controller 10 with the outer surface of flexible cover 301 removed to show the underlying offset ribs 307.

The offset ribs 307 hold the outer surface of the flexible cover 301 away from the outer surface of controller 10, thereby creating air channels 309. These air channels 309 direct airflow to regions near the user's hands, in a typical grip. It is to be understood that offset ribs 307 and the air channels 309 end at channel end wall 311 before they reach the front of controller 10. Since air channels 309 are intended to provide cooling air to the hands of a user playing a game, there is no need for air channels 309 and ventilation apertures 315 to extend forward past the portion of controller 10 held by a user.

Figure 8:
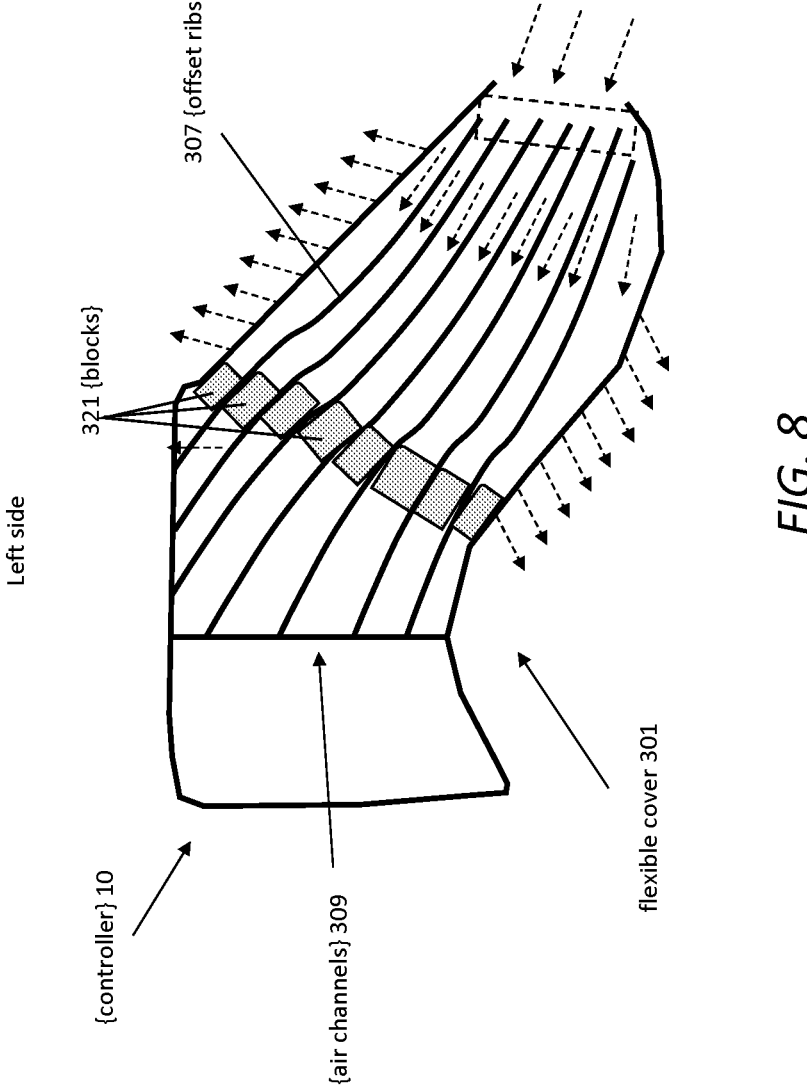
FIG. 8 is a partially cut-away, side elevational view of the cooling cover showing blocks being utilized in the air channels as another embodiment of the current invention.

FIG. 8 is a partially cut-away, side elevational view of an embodiment of the flexible cooling cover 301 showing blocks 321 positioned in the air channels 309 thereby blocking the flow of air along the air channels 309, as an alternative embodiment of the current invention. Since various users may use the controller 10 with the flexible cooling cover 301, it may be adjustable to optimize the amount of cooling air directed toward the user's hands. Since different users have hands with different sizes, the flexible cover 301 may be modified for each user. As shown in FIG. 8, blocks 321 may be inserted into one or more air channels 309 and held by friction between offset ribs 307 thereby blocking further flow through the air channels 309. By blocking airflow in a portion of the air channels 309, it creates increased pressure and provides increased ventilation to regions that are not blocked. These may be placed further or closer to the front of controller 10 in order to adjust the area in which the cooling air is released. This allows each user to customize the cooling cover assembly 100 to maximize the cooling air provided to the user's hands.

While it has not been mentioned, one familiar in the art would realize that the flexible cooling cover assembly is not limited by the materials used to create each apparatus that comprises the invention. Any other material type can be chosen to comprise some or all of the elements of the flexible cooling cover assembly in various embodiments of the present invention.

Although the present invention has been illustrated and described herein with reference to preferred embodiments and specific examples thereof, it will be readily apparent to those of ordinary skill in the art that other embodiments and examples may perform similar functions and/or achieve similar results. All such equivalent embodiments and examples are within the spirit and scope of the present invention, are contemplated thereby, and are intended to be covered by the following claims.

What is claimed is:

1. A cover assembly for a hand-held video game controller, comprising:
   a hand-held video game controller, comprising;
      a top pad,
      a first controller lobe located along a first side of the top pad,
      a second controller lobe located along a second side of the top pad,
      a plurality of directional buttons located along one end of the first controller lobe, and
      a plurality of selection buttons located along one end of the second controller lobe; and a cover located over the hand-held video game controller, comprising;
   a first cover portion that covers a portion of the first controller lobe,
   a second cover portion that covers a portion of the second controller lobe,
   a first extension operatively connected to a first end of the first cover portion,
   a second extension operatively connected to a first end of the second cover portion,
   a first attachment device operatively connected to the first extension,
   a second attachment device operatively connected to the second extension,
   a first fan located adjacent to a second end of the first cover portion, and
   a second fan located adjacent to a second end of the second cover portion.

2. The cover assembly, according to claim 1, wherein the cover assembly further comprises:
   a first opening located on the first cover portion, wherein the first opening is sized and shaped to accommodate the plurality of directional buttons; and
   a second opening located on the second cover portion, wherein the second opening is sized and shaped to accommodate the plurality of selection buttons.

3. The cover assembly, according to claim 1, wherein the first and second attachment devices are magnetic attachment devices.

4. The cover assembly, according to claim 1, wherein the cover assembly further comprises:
   a plurality of offset ribs located around a periphery of an inside surface of the first and second cover portions, wherein the plurality of offset ribs are each spaced a predetermined distance from each other;
   a plurality of air channels, wherein each of the plurality of air channels is located between each of plurality of offset ribs;
   a plurality of ventilation apertures located along a length of each of the first and second cover portions; and
   a plurality of outer protrusions located around a periphery of an outside surface of the first and second cover portions, wherein the plurality of outer protrusions are each spaced a predetermined distance from each other.

5. The cover assembly, according to claim 1, wherein the cover assembly further comprises:
   a removable battery assembly operatively connected to the cover assembly.

6. The cover assembly, according to claim 1, wherein the cover assembly further comprises:
   a plurality of reinforcement ribs operatively connected to the first and second cover portions.

7. A hand-held video game controller, comprising:
   a hand-held video game controller, comprising;
      a top pad,
      a first controller lobe located along a first side of the top pad,
      a second controller lobe located along a second side of the top pad,
      a plurality of directional buttons located along one end of the first controller lobe, and
      a plurality of selection buttons located along one end of the second controller lobe; and
   a cover located over the hand-held video game controller, comprising;
      a first cover portion that covers a portion of the first controller lobe, a second cover portion that covers a portion of the second controller lobe, a first extension operatively connected to a first end of the first cover portion, a second extension operatively connected to a first end of the second cover portion, a first attachment device operatively connected to the first extension, a second attachment device operatively connected to the second extension, a first fan located adjacent to a second end of the first cover portion; and a second fan located adjacent to a second end of the second cover portion.

8. The hand-held video game controller, according to claim 7, wherein the cover assembly further comprises:

a first opening located on the first cover portion, wherein the first opening is sized and shaped to accommodate the plurality of directional buttons; and a second opening located on the second cover portion, wherein the second opening is sized and shaped to accommodate the plurality of selection buttons.

9. The hand-held video game controller, according to claim 7, wherein the first and second attachment devices are magnetic attachment devices.

10. The hand-held video game controller, according to claim 7, wherein the cover assembly further comprises:

a plurality of offset ribs located around a periphery of an inside surface of the first and second cover portions, wherein the plurality of offset ribs are each spaced a predetermined distance from each other;

a plurality of air channels, wherein each of the plurality of air channels is located between each of plurality of offset ribs;

a plurality of ventilation apertures located along a length of each of the first and second cover portions; and a plurality of outer protrusions located around a periphery of an outside surface of the first and second cover portions, wherein the plurality of outer protrusions are each spaced a predetermined distance from each other.

11. The hand-held video game controller, according to claim 7, wherein the cover assembly further comprises:

a removable battery assembly operatively connected to the cover assembly.

12. The hand-held video game controller, according to claim 7, wherein the cover assembly further comprises:

a plurality of reinforcement ribs operatively connected to the first and second cover portions.

13. A method of constructing a cover assembly for a hand-held video game controller, the method comprising:

providing a hand-held video game controller, comprising;

a top pad, a first controller lobe located along a first side of the top pad, a second controller lobe located along a second side of the top pad, a plurality of directional buttons located along one end of the first controller lobe, and a plurality of selection buttons located along one end of the second controller lobe; and locating a cover over the hand-held video game controller, wherein the cover comprises;

providing a first cover portion that covers a portion of the first controller lobe, providing a second cover portion that covers a portion of the second controller lobe, providing a first extension operatively connected to a first end of the first cover portion, providing a second extension operatively connected to a first end of the second cover portion, providing a first attachment device operatively connected to the first extension, providing a second attachment device operatively connected to the second extension, attaching a first fan adjacent to a second end of the first cover portion; and attaching a second fan adjacent to a second end of the second cover portion.

14. The method, according to claim 13, wherein the method further comprises:

providing a first opening located on the first cover portion, wherein the first opening is sized and shaped to accommodate the plurality of directional buttons; and providing a second opening located on the second cover portion, wherein the second opening is sized and shaped to accommodate the plurality of selection buttons.

15. The method, according to claim 13, wherein the first and second attachment devices are magnetic attachment devices.

16. The method, according to claim 13, wherein the method further comprises:

providing a plurality of offset ribs around a periphery of an inside surface of the first and second cover portions, wherein the plurality of offset ribs are each spaced a predetermined distance from each other;

creating a plurality of air channels, wherein each of the plurality of air channels is located between each of plurality of offset ribs;

providing a plurality of ventilation apertures along a length of each of the first and second cover portions; and providing a plurality of outer protrusions around a periphery of an outside surface of the first and second cover portions, wherein the plurality of outer protrusions are each spaced a predetermined distance from each other.

17. The method, according to claim 13, wherein the method further comprises:

providing a removable battery assembly that is operatively connected to and the cover assembly.

* * * * *